(12) United States Patent
Senyo

(10) Patent No.: US 11,841,250 B2
(45) Date of Patent: Dec. 12, 2023

(54) ENCODER ABNORMALITY DIAGNOSIS DEVICE

(71) Applicant: OKUMA Corporation, Aichi (JP)

(72) Inventor: Tatsuru Senyo, Aichi (JP)

(73) Assignee: OKUMA CORPORATION, Aichi (JP)

(*) Notice: Subject to any disclaimer, the term of this patent is extended or adjusted under 35 U.S.C. 154(b) by 0 days.

(21) Appl. No.: 17/504,962

(22) Filed: Oct. 19, 2021

(65) Prior Publication Data

US 2022/0120591 A1 Apr. 21, 2022

(30) Foreign Application Priority Data

Oct. 20, 2020 (JP) .................................. 2020-176309

(51) Int. Cl.
*G01D 5/244* (2006.01)
*G01D 5/248* (2006.01)

(52) U.S. Cl.
CPC ......... *G01D 5/24457* (2013.01); *G01D 5/248* (2013.01)

(58) Field of Classification Search
CPC ............. G01D 5/2451; G01D 5/24457; G01D 5/24466; G01D 5/248; G01P 13/00; G01P 3/44; G01P 3/48; G01P 3/4802; G01P 3/481

See application file for complete search history.

(56) References Cited

U.S. PATENT DOCUMENTS

| 4,769,630 | A | * | 9/1988 | Taillebois | ............. | H03M 1/303 |
| | | | | | | 341/13 |
| 5,127,035 | A | * | 6/1992 | Ishii | .................. | G01D 5/24404 |
| | | | | | | 377/28 |
| 5,568,131 | A | * | 10/1996 | Sakai | ..................... | G01P 13/00 |
| | | | | | | 318/434 |
| 5,717,302 | A | * | 2/1998 | Sakai | ..................... | G01P 21/02 |
| | | | | | | 340/648 |

(Continued)

FOREIGN PATENT DOCUMENTS

| GB | 2092755 A | * | 8/1982 | ............. G01P 13/00 |
| WO | WO-2022039733 A1 | * | 2/2022 | |

OTHER PUBLICATIONS

Apfeld, R., "Do safe drive controls also require safe position encoders?", IFA, Position encoders (2013); pp. 1-9.

*Primary Examiner* — Steven L Yeninas
(74) *Attorney, Agent, or Firm* — CANTOR COLBURN LLP

(57) ABSTRACT

An encoder abnormality diagnosis device configured to diagnose an abnormality in an encoder that outputs a cosine waveform and a sine waveform according to a rotation angle of an object includes a stop determination processing unit configured to determine whether the object is rotating or stopping, based on a change in a count value of a pulse signal obtained by pulsing of each of the cosine waveform and the sine waveform, a frequency measurement unit configured to measure a frequency of the pulse signal, and (Continued)

a frequency diagnosis unit configured to compare the frequency measured by the frequency measurement unit with a preset upper limit frequency when the stop determination processing unit determines that the object is stopping, and to determine that an abnormality has occurred in the encoder when the measured frequency exceeds the upper limit frequency.

5 Claims, 5 Drawing Sheets

(56) References Cited

U.S. PATENT DOCUMENTS

| | | | | |
|---|---|---|---|---|
| 5,773,972 | A * | 6/1998 | Futsuhara | G01D 5/2451 |
| | | | | 318/799 |
| 5,861,813 | A * | 1/1999 | Futsuhara | F16P 3/08 |
| | | | | 340/679 |
| 6,002,249 | A * | 12/1999 | Futsuhara | G01P 21/02 |
| | | | | 324/160 |
| 6,148,055 | A * | 11/2000 | Sakai | G01R 31/318527 |
| | | | | 377/28 |
| 6,333,614 | B1 * | 12/2001 | Kerner | H02H 7/093 |
| | | | | 318/687 |
| 2006/0250124 | A1 * | 11/2006 | Ether | G01P 3/42 |
| | | | | 324/160 |
| 2016/0054351 | A1 * | 2/2016 | Dunbar | G01P 13/045 |
| | | | | 324/207.25 |
| 2019/0074780 | A1 * | 3/2019 | Furukawa | G01D 5/12 |
| 2020/0011710 | A1 * | 1/2020 | Müller | G01D 5/24461 |
| 2020/0182656 | A1 * | 6/2020 | Poley | H02K 11/21 |

* cited by examiner

ENCODER ABNORMALITY DIAGNOSIS DEVICE

CROSS REFERENCE TO RELATED APPLICATION

The present invention claims priority under 35 U.S.C. § 119 to Japanese Patent Application No. 2020-176309 filed on Oct. 20, 2020, which is incorporated herein by reference in its entirety including the specification, claims, drawings, and abstract.

TECHNICAL FIELD

This specification discloses an encoder abnormality diagnosis device configured to diagnose an abnormality in an encoder that outputs a cosine waveform and a sine waveform according to a rotation angle of an object.

BACKGROUND

With regard to a spindle of a machine tool, a speed limit monitoring function is required by the International Standard. For example, with regard to a spindle of a lathe, ISO 23125 requires speed limit monitoring in Safety Category 3.

As a detector for a spindle of the machine tool, there is generally used a detector such as a magnetic encoder which outputs sine and cosine waveforms with N cycles per rotation, according to a rotation angle (hereinafter, referred to as a sine/cosine signal output encoder).

A method of achieving speed monitoring in Safety Category 3 using the sine/cosine signal output encoder is disclosed in Apfeld, R., "Do safe drive controls also require safe position encoders?", [online], Internet <URL: http://www.dguv.de/medien/ifa/en/pub/rep/pdf/reports2013/ifar0713e/safe_drive_controls. pdf> (Non-Patent Document 1), for example. In Non-Patent Document 1, there is disclosed a method to be performed using a single sine/cosine signal output encoder. In the case where a single sine/cosine signal output encoder is used, a high diagnostic rate is required for an encoder output signal. Therefore, it is necessary to diagnose the cosine waveform and the sine waveform based on $\sin^2 + \cos^2 = 1$, and Non-Patent Document 1 discloses that the diagnostic rate 99% can be achieved by the diagnosis of $\sin^2 + \cos^2 = 1$.

FIG. 2 is a block diagram when the speed is monitored in Safety Category 3 using a single sine/cosine signal output encoder. In FIG. 2, an encoder 1 outputs a sine/cosine waveform including cosine waveform=$A \cdot \cos(N \cdot \theta)$ and sine waveform=$A \cdot \sin(N \cdot \theta)$ according to a rotation angle $\theta$, where N represents frequencies of the sine and cosine waveforms that are output per rotation of the encoder. The N is determined by the number of teeth of a gear in a magnetic encoder or by the number of slits in an optical encoder. A level conversion circuit 2 converts the cosine waveform into a voltage level available for a subsequent-stage circuit to output it as Vc. A pulsing circuit 3 converts Vc into a pulse signal. Similarly, a level conversion circuit 4 converts the sine waveform into a voltage level available for a subsequent-stage circuit to output it as Vs, and a pulsing circuit 5 converts Vs into a pulse signal. The pulse signals output by the respective pulsing circuits 3 and 5 are pulse signals whose phases are shifted by 90° with each other, and counters 6 and 8 count pulses multiplied by four in a known method. A speed monitoring unit 7 calculates a rotation speed of the encoder based on a change amount in the count value of the counter 6 and monitors the speed. In the case where the speed exceeds a speed limit, the speed monitoring unit 7 outputs an abnormal signal to an abnormality processing unit 14. Similarly, a speed monitoring unit 9 calculates a rotation speed of the encoder based on a change amount in the count value of the counter 8 and monitors the speed. In the case where the speed exceeds a speed limit, the speed monitoring unit 9 outputs an abnormal signal to the abnormality processing unit 14. The speed monitoring units 7 and 9 mutually monitor the respective speed calculation results and the respective speed monitoring results, and output the respective abnormal signals to the abnormality processing unit 14 in the case where a difference arises between the calculation results of the speed monitoring units 7 and 9. AD converters 10 and 11 perform AD-conversion on the signal Vc and the signal Vs that are output from the level conversion circuits 2 and 4, respectively, and output the respective AD-converted signals to a Lissajous radius calculation processing unit 12. The Lissajous radius calculation processing unit 12 performs various corrections including an offset correction, an amplitude ratio correction, a phase correction, and the like, with respect to the AD conversion results of the signal Vc and the signal Vs that are output by the AD converters 10 and 11, respectively, and then calculates a Lissajous radius. A diagnosis processing unit 13 outputs an abnormal signal to the abnormality processing unit 14 in the case where the Lissajous radius is outside a predetermined reference range. The abnormality processing unit 14 performs an abnormality process such as turning off the energization of a motor, in the case where any one of the speed monitoring units 7 and 9, and the diagnosis processing unit 13 outputs the abnormal signal.

The diagnosis processing unit 13 outputs the abnormal signal to the abnormality processing unit 14 in the case where a Lissajous radius 22 output by the Lissajous radius calculation processing unit 12 illustrated in FIG. 3 exceeds an upper limit threshold 23 or below a lower limit threshold 24 of the Lissajous radius. Hereinafter, a range defined by the upper limit threshold 23 and the lower limit threshold 24 is referred to as the "reference range."

The Lissajous radius of the cosine and sine waveforms output by the encoder fluctuate due to various factors. In the case of the magnetic encoder, examples of such fluctuation factors may include fluctuation in a gap between the gear and the encoder in the state of being attached, fluctuation in a rotation period of the encoder due to eccentricity of the gear, fluctuation in the ambient temperature, and fluctuation in the rotation frequency of the encoder. Therefore, it is necessary to set a threshold used for the diagnosis of the Lissajous radius while reflecting such fluctuation amounts; otherwise excess detection may occur such as the radius falsely being detected as being abnormal in spite of being normal.

However, a Lissajous waveform 21 as illustrated in FIG. 4 may be generated depending on a failure mode of the encoder. In this case, the Lissajous waveform 21 reciprocates between the first quadrant and the fourth quadrant, and the counter repeats counting up and down, whereby the object will be determined to be in a stopped state even while rotating. Furthermore, the Lissajous waveform 21 always falls within the reference range, which makes detection of the abnormality impossible. Needless to say, the Lissajous waveform 21 illustrated in FIG. 4 can be detected as being abnormal by narrowing the reference range, but narrowing the reference range makes it impossible to accept the fluctuation in the Lissajous radius due to the above-described temperature fluctuation or the like, whereby the excess detection occurs.

Thus, this specification discloses an encoder abnormality diagnosis device capable of detecting an abnormality in an encoder more accurately.

SUMMARY

An encoder abnormality diagnosis device disclosed in this specification is an encoder abnormality diagnosis device configured to diagnose an abnormality in an encoder that outputs a cosine waveform and a sine waveform according to a rotation angle of an object, the encoder abnormality diagnosis device including a stop determination processing unit configured to determine whether the object is rotating or stopping, based on a change in a count value of a pulse signal obtained by pulsing of each of the cosine waveform and the sine waveform, a frequency measurement unit configured to measure a frequency of the pulse signal, and a frequency diagnosis unit configured to compare the frequency measured by the frequency measurement unit with a preset upper limit frequency when the stop determination processing unit determines that the object is stopping, and to determine that an abnormality has occurred in the encoder when the measured frequency exceeds the upper limit frequency.

In this case, the upper limit frequency may be determined based on a control cycle of the object.

The upper limit frequency may be determined based on a maximum acceleration of the object and a hysteresis width used for the pulsing.

According to the encoder abnormality diagnosis device disclosed in this specification, presence or absence of rotation is also checked based on the frequency of the pulse signal when the object is determined to be stopping, whereby an abnormality in an encoder can be detected more accurately.

BRIEF DESCRIPTION OF DRAWINGS

Embodiment(s) of the present disclosure will be described based on the following figures, wherein.

DESCRIPTION OF EMBODIMENTS

Figure 1:
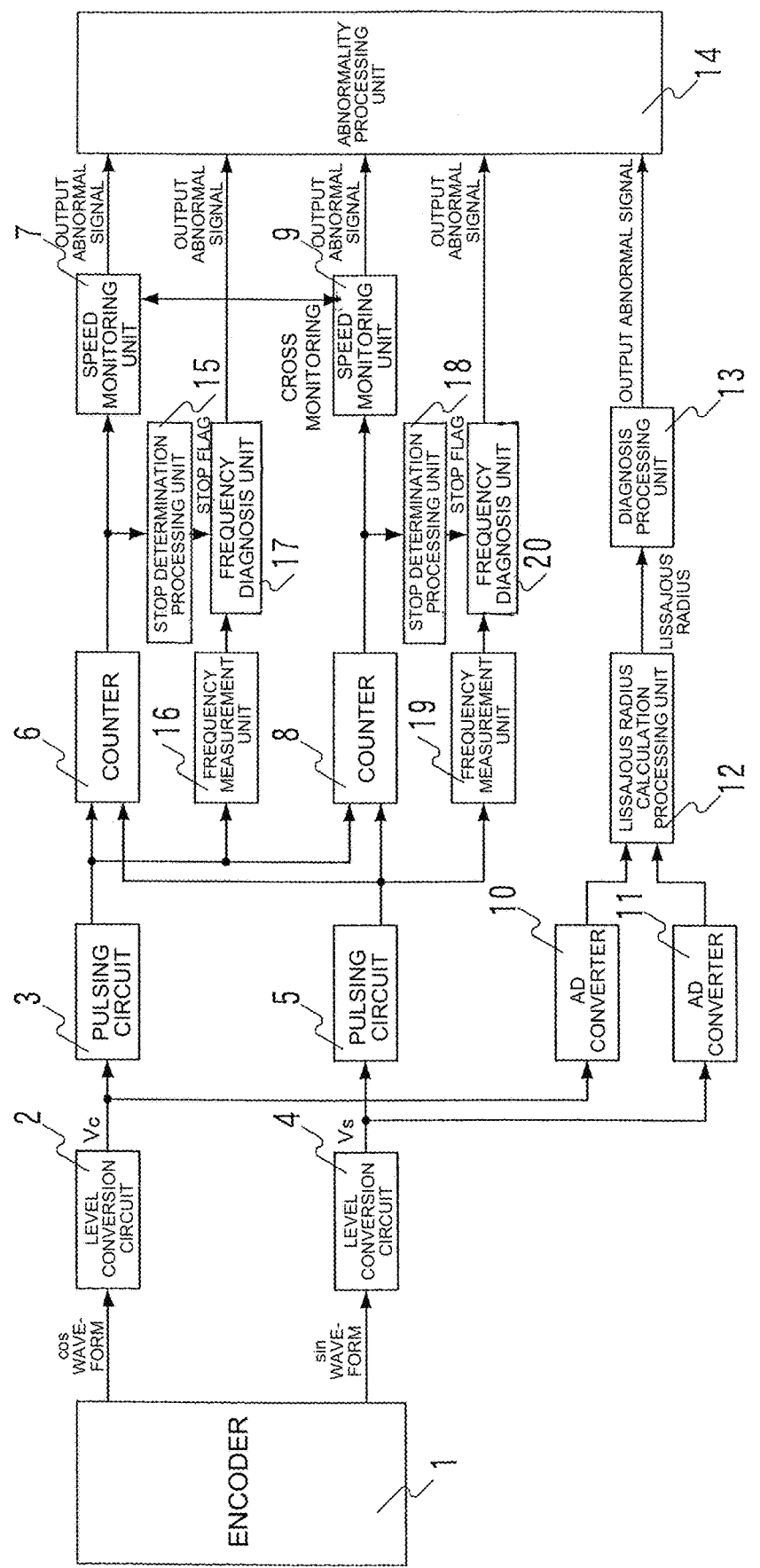
FIG. 1 is a block diagram illustrating a configuration of an encoder abnormality diagnosis device.
Figure 2:
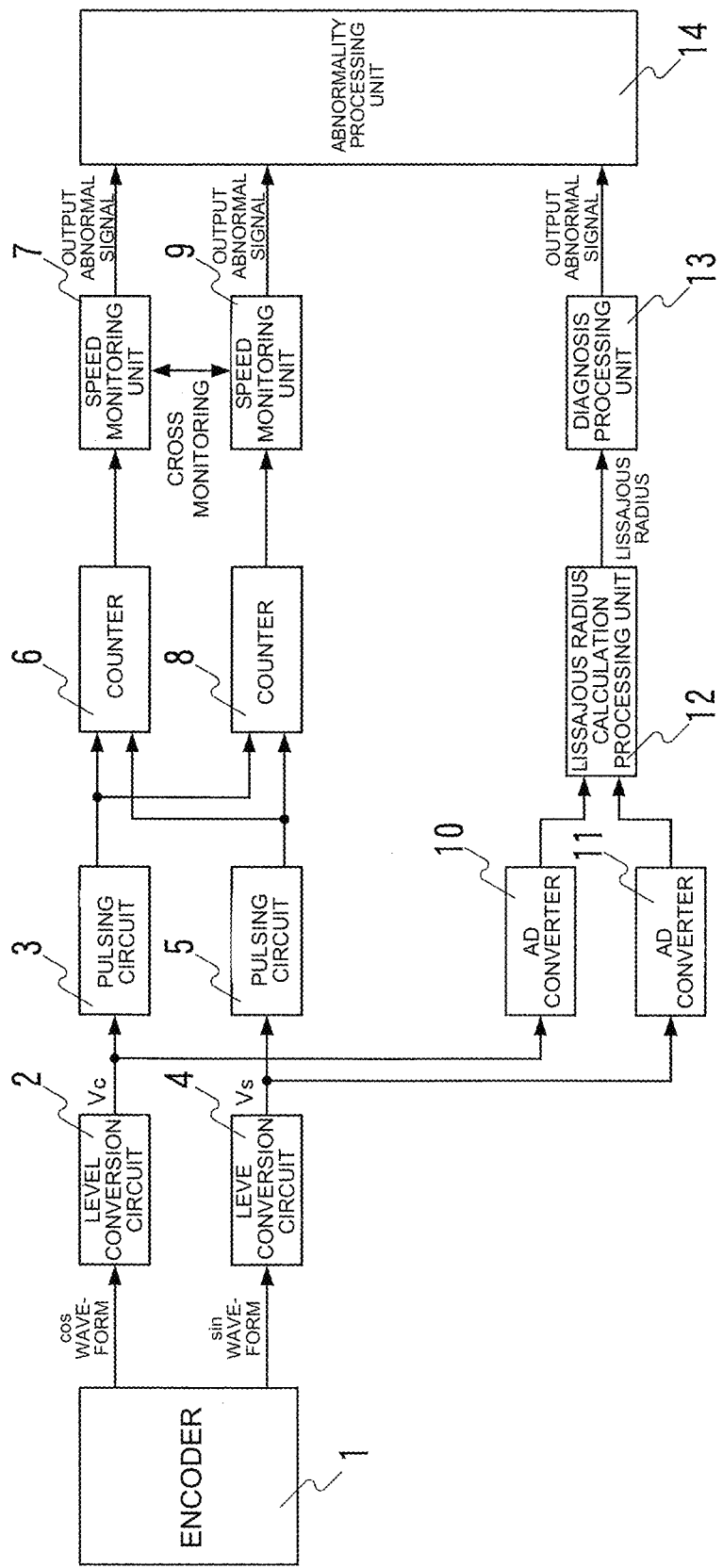
FIG. 2 is a block diagram illustrating a configuration of a conventional encoder abnormality diagnosis device.

A configuration of an encoder abnormality diagnosis device will be described by reference to FIG. 1, FIG. 5, FIG. 6, and FIG. 7. FIG. 1 is a block diagram of the encoder abnormality diagnosis device. An encoder 1 outputs a sine/cosine signal including cosine waveform=$A \cdot \cos(N \cdot \theta)$ and sine waveform=$A \cdot \sin(N \cdot \theta)$ according to a rotation angle $\theta$, where N represents frequencies of the sine and cosine waveforms that are output per rotation of the encoder. N is determined by the number of teeth of a gear in a magnetic encoder or by the number of slits in an optical encoder. A level conversion circuit 2 converts the cosine waveform into a voltage level available for a subsequent-stage circuit to output it as Vc. A pulsing circuit 3 converts Vc into a pulse signal. Similarly, a level conversion circuit 4 converts the sine waveform into a voltage level available for a subsequent-stage circuit to output it as Vs, and a pulsing circuit 5 converts the Vs into a pulse signal. The pulse signals output by the respective pulsing circuits 3 and 5 are pulse signals whose phases are shifted by 90° from each other, and counters 6 and 8 count pulses multiplied by four in a known method. A speed monitoring unit 7 calculates a rotation speed of the encoder based on a change amount in the count value of the counter 6 and monitors the speed. In the case where the speed exceeds a speed limit, the speed monitoring unit 7 outputs an abnormal signal to an abnormality processing unit 14. Similarly, a speed monitoring unit 9 calculates a rotation speed of the encoder based on a change amount in the count value of the counter 8 and monitors the speed. In the case where the speed exceeds a speed limit, the speed monitoring unit 9 outputs an abnormal signal to the abnormality processing unit 14. The speed monitoring units 7 and 9 mutually monitor the respective speed calculation results and the respective speed monitoring results, and output the abnormal signals to the abnormality processing unit 14 in the case where a difference arises between the calculation results of the speed monitoring units 7 and 9.

AD converters 10 and 11 perform AD-conversion on the signal Vc and the signal Vs that are output from the level conversion circuits 2 and 4, respectively, and output the respective AD-converted signals to a Lissajous radius calculation processing unit 12. The Lissajous radius calculation processing unit 12 performs various corrections including an offset correction, an amplitude ratio correction, a phase correction, and the like with respect to the AD conversion results of the signal Vc and the signal Vs that are output by the AD converters 10 and 11, respectively, and then calculates a Lissajous radius. A diagnosis processing unit 13 outputs an abnormal signal to the abnormality processing unit 14 in the case where the Lissajous radius is outside a predetermined reference range.

A stop determination processing unit 15 determines whether an object is rotating or stopping, based on the count value output from the counter 6. The stop determination processing unit 15 outputs, to a frequency diagnosis unit 17, a stop flag in an on state when determining that the object is stopping, and the stop flag in an off state when determining that the object is rotating. A frequency measurement unit 16 measures a frequency of the pulse signal output by the pulsing circuit 3, and outputs the measured frequency to the frequency diagnosis unit 17. The frequency diagnosis unit 17 compares the frequency of the pulse signal output by the frequency measurement unit 16 with an upper limit frequency when the stop flag output by the stop determination processing unit 15 is on, and outputs an abnormal signal to the abnormality processing unit 14 in the case where the frequency of the pulse signal exceeds the upper limit frequency.

Similarly, a stop determination processing unit 18 determines whether the object is rotating or stopping, based on the count value output from the counter 8. The stop determination processing unit 18 outputs, to a frequency diagnosis unit 20, a stop flag in an on state when determining that the object is stopping, and the stop flag in an off state when determining that the object is rotating. A frequency measurement unit 19 measures a frequency of the pulse signal output by the pulsing circuit 5, and outputs the measured frequency to the frequency diagnosis unit 20. The frequency diagnosis unit 20 compares the frequency of the pulse signal output by the frequency measurement unit 19 with an upper limit frequency when the stop flag output by the stop determination processing unit 18 is on, and outputs an abnormal signal to the abnormality processing unit 14 in the case where the frequency of the pulse signal exceeds the upper limit frequency.

The abnormality processing unit 14 performs an abnormality process such as turning off the energization of a motor, in the case where any one of the speed monitoring units 7 and 9, the diagnosis processing unit 13, and the frequency diagnosis units 17 and 20 outputs the abnormal signal.

Figure 5:
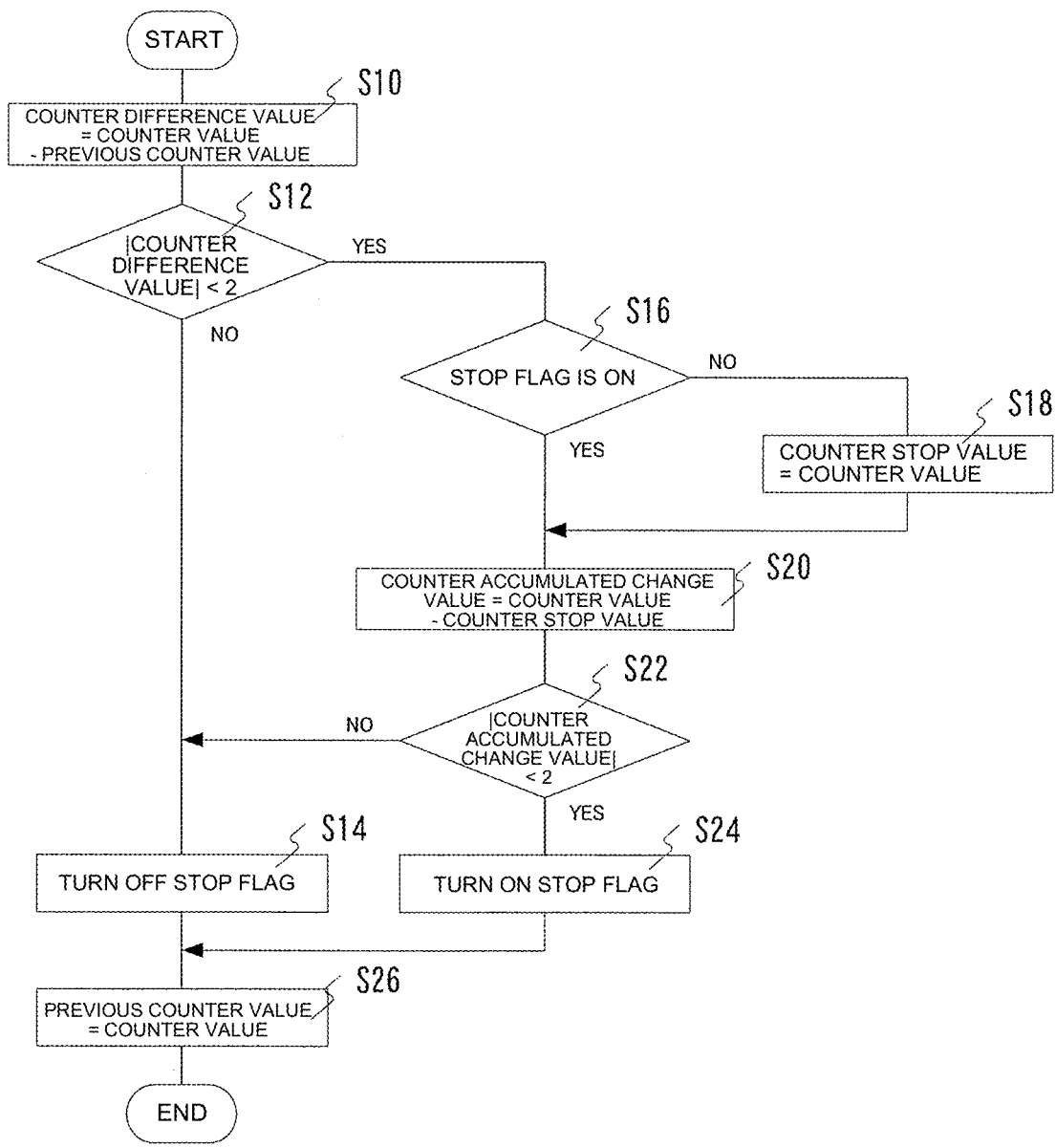
FIG. 5 is a flowchart illustrating a flow of a stop determination processing.

FIG. 5 is a flowchart illustrating a flow of processing to be performed by the stop determination processing unit 15. The stop determination processing unit 15 inputs the counter value output from the counter 6, and calculates a value obtained by subtracting a previous counter value from a current counter value, as a counter difference value (S10). When an absolute value of the counter difference value is equal to or greater than 2 (No in S12), the stop determination processing unit 15 determines that the object is rotating, and turns off the stop flag (S14). On the other hand, when the absolute value of the counter difference value is smaller than 2 (Yes in S12), the stop determination processing unit 15 proceeds to step S16.

In step S16, the stop determination processing unit 15 checks the current state of the stop flag. As a result of the check, when the stop flag is off (No in S16), the stop determination processing unit 15 sets a current counter value as a value of a counter stop value (S18), and proceeds to step S20. The counter stop value is a counter value when the stop flag is switched from off to on. On the other hand, when the stop flag is on (Yes in S16), the stop determination processing unit 15 proceeds directly to step S20, without resetting the counter stop value.

In step S20, the stop determination processing unit 15 calculates, as a counter accumulated change value, a value obtained by subtracting the counter stop value from the current counter value. Then, when an absolute value of the counter accumulated change value is equal to or greater than 2 (No in S22), the stop determination processing unit 15 determines that the object is rotating, and turns off the stop flag (S14). On the other hand, when the absolute value of the counter accumulated change value is less than 2 (Yes in S22), the stop determination processing unit 15 determines that the object is stopping, and turns on the stop flag (S24). When the stop flag is set in step S14 or step S24, the stop determination processing unit 15 records the current counter value as the previous counter value (S26), and returns to step S10. Thereafter, similar processing is repeated every time the counter value is output.

Figure 4:
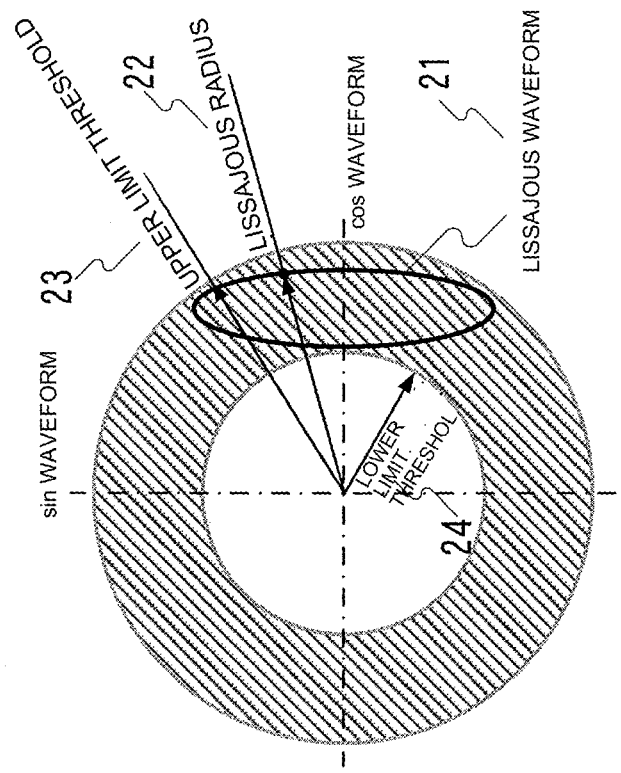
FIG. 4 is a view illustrating an example of a Lissajous waveform when an abnormality has occurred in the encoder.
Figure 3:
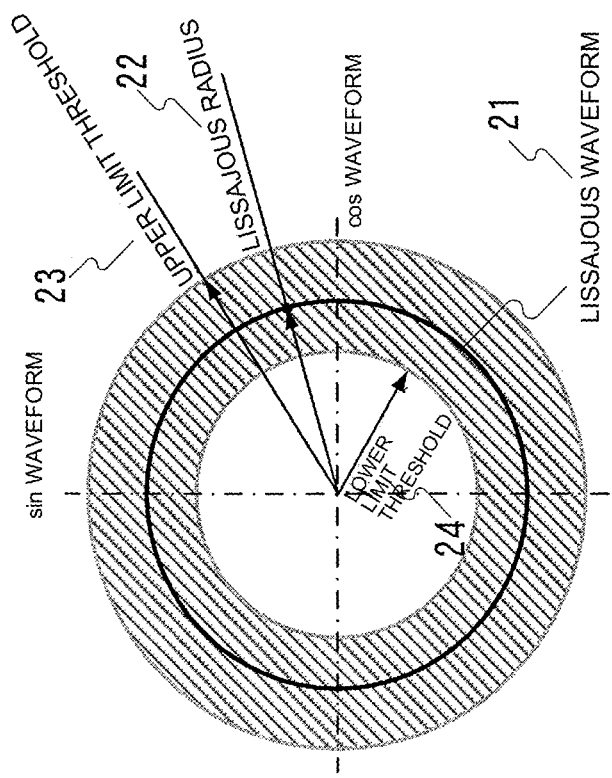
FIG. 3 is a view illustrating an example of a Lissajous waveform when an encoder is normal.

As is clear from the foregoing description, in this example, whether the object is rotating is determined based on the absolute value of the counter difference value. Accordingly, in the case where the Lissajous waveform 21 as illustrated in FIG. 4 is generated due to failure of the encoder, the counter repeats counting up and down. As a result, the stop determination processing unit 15 determines that the object is stopping even while rotating, and turns on the stop flag. The same applies to the determination processing to be performed by the stop determination processing unit 18.

As described above, the determination result by the stop determination processing unit 15, 18 is input to the frequency diagnosis unit 17, 20. When the stop flag is on, the frequency diagnosis unit 17, 20 compares the frequency of the pulse signal output by the frequency measurement unit 16, 19 with a preset upper limit frequency $f_{max}$. This is to determine that an abnormality has occurred in the case where the Lissajous waveform 21 as illustrated in FIG. 4 is generated.

That is, in the case where the Lissajous waveform 21 as illustrated in FIG. 4 is generated, the stop determination processing unit 15, 18 determines that a spindle (an object to be measured) is stopping (that is, the stop flag is on) even while rotating, and therefore cannot detect the abnormality in the encoder. Then, in this example, in the case where the stop flag is on, the frequency of the pulse signal is compared with the upper limit frequency $f_{max}$, and it is determined that the abnormality has occurred, in the case where the frequency of the pulse signal exceeds the upper limited frequency $f_{max}$.

The upper limit frequency $f_{max}$ is set to a value that can exclude the case where the spindle is oscillated minutely. That is, the stop flag is turned on not only when the abnormality has occurred in the encoder but also when the spindle is oscillated minutely. In the case where the spindle is oscillated minutely, the frequency of the pulse signal is non-zero, but this state does not correspond to the abnormality in the encoder. Then, the upper limit frequency $f_{max}$ is set to a value that is sufficiently greater than the frequency of the pulse signal obtained when the minute oscillation has occurred, thereby preventing the minute oscillation from being determined as the abnormality.

Figure 6:
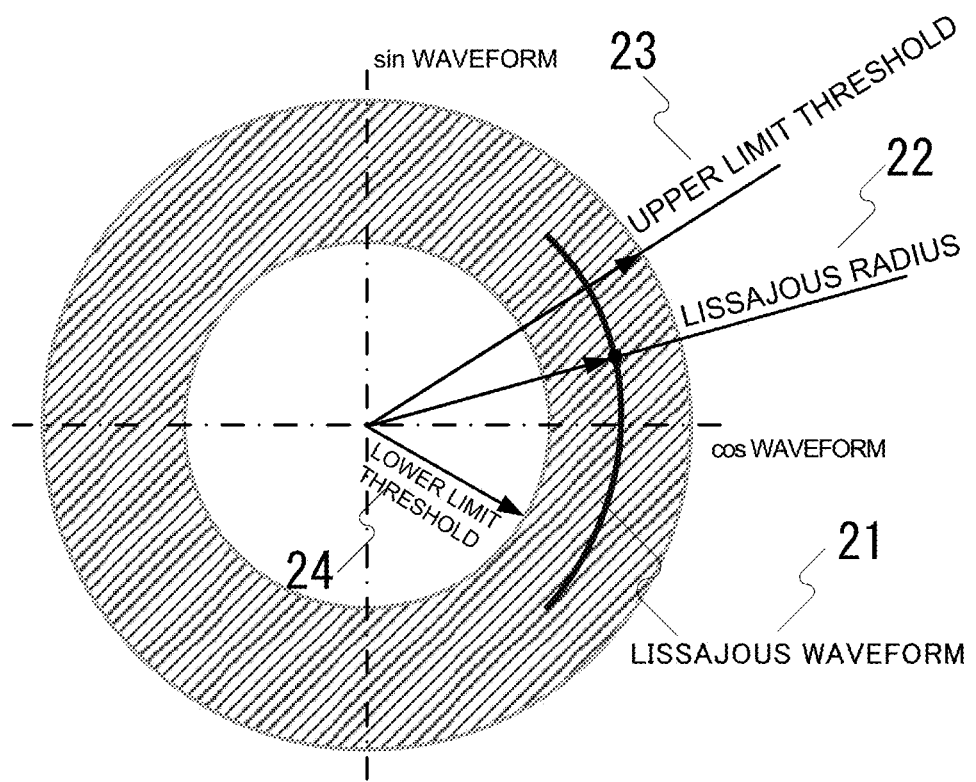
FIG. 6 is a view illustrating an example of a Lissajous waveform in an oscillation state.
Figure 7:
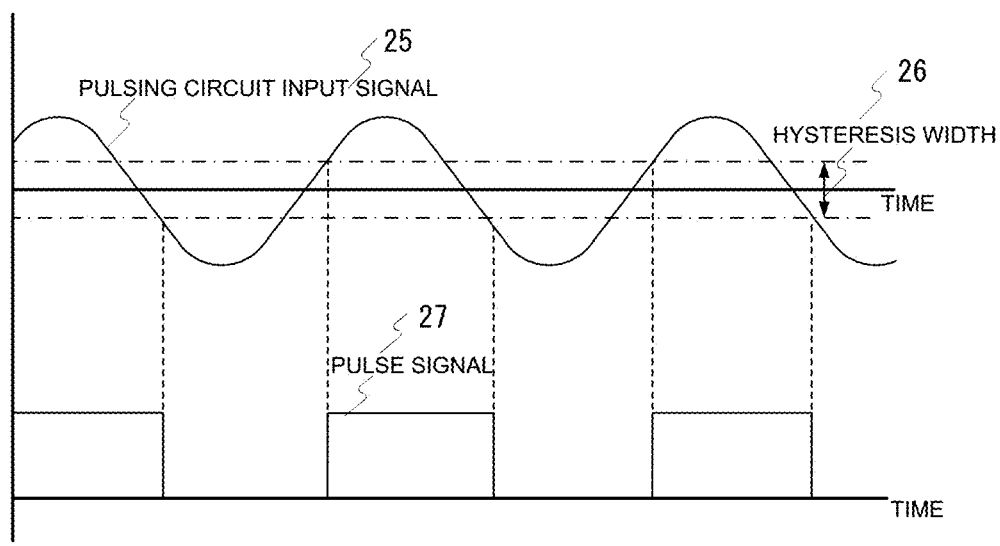
FIG. 7 is a graph illustrating an operation of a pulsing circuit.

The setting of the upper limit frequency $f_{max}$ will be described with reference to FIG. 6 and FIG. 7. FIG. 6 is a view illustrating an example of the Lissajous waveform 21 in an oscillation state. FIG. 7 is a graph illustrating an input/output relationship of the pulsing circuit 5. The pulsing circuit 5 generally includes a hysteresis comparator. Therefore, in the case where an oscillation amplitude of a pulsing circuit input signal 25 is smaller than a specific hysteresis width 26, a pulse signal 27 is not output from the pulsing circuit 5. In this case, the frequency output by the frequency measurement unit 19 becomes zero. Accordingly, in the case where the frequency measurement unit 19 outputs a frequency other than zero, it can be said that oscillation having an amplitude equal to or greater than the hysteresis width 26 has occurred.

Here, the frequency of the pulse signal 27 when the Lissajous waveform 21 as illustrated in FIG. 4 is generated due to the abnormality of the encoder is high such that it cannot be generated in the normal oscillation state of the spindle. In this example, the upper limit frequency allowable in the normal oscillation state of the spindle is set as the upper limit frequency $f_{max}$. For example, the upper limit frequency $f_{max}$ is determined based on a control cycle Tc of the spindle. When the control cycle of the spindle is Tc, or when the frequency is 1/Tc, a command exceeding the nyquist frequency $(1/(2 \cdot Tc))$ cannot be output to the spindle. That is, it can be said that $(1/(2 \cdot Tc))$ is the upper limit frequency allowable in the normal oscillation state of the spindle. Accordingly, the upper limit frequency is set as $f_{max}=(1/(2 \cdot Tc))$, and it may be determined that the abnormality has occurred in the case where the frequency of the pulse signal 27 exceeds $f_{max}=(1/(2 \cdot Tc))$.

As another mode, the upper limit frequency $f_{max}$ may be determined based on an allowable maximum acceleration $\alpha_{max}$ of the spindle. That is, as described above, when the pulse signal 27 is obtained, Peak to Peak of the sine waveform or the cosine waveform becomes equal to or greater than the hysteresis width 26 (hereinafter, referred to as a "hysteresis width ΔH"). Therefore, in the case of the minimum amplitude at which the pulse signal 27 changes, in the case of the Lissajous waveform 21 illustrated in FIG. 6, the spindle angle θ oscillates with an amplitude of (ΔH/2), in one tooth of the encoder. The spindle angle θ is represented by the following expression 1, where Z is the number of teeth of the encoder, t is time, and ϕ is the initial phase.

$$\theta = (\Delta H/2) \times (1/Z) \times \sin(2\pi f \cdot t + \phi) \quad \text{Expression 1}$$

The acceleration α is obtained by differentiating expression 1 twice, and is represented by expression 2.

$$\alpha = -(\Delta H \times 2\pi^2 f^2)/Z \times \sin(2\pi f \cdot t + \phi) \quad \text{Expression 2}$$

The frequency f when the acceleration a becomes the maximum acceleration $\alpha_{max}$ may be set as the upper limit frequency $f_{max}$. Accordingly, the upper limit frequency $f_{max}$ is obtained by solving the expression obtained by substituting $\alpha_{max}$ for a in expression 2 for the frequency f, and is represented by the following expression 3.

$$f_{max} = 1/\pi \times ((\alpha_{max} \cdot Z)/(2\Delta H))^{1/2} \quad \text{Expression 3}$$

Thus, when the upper limit frequency $f_{max}$ is determined based on the control cycle or the maximum acceleration, the minute oscillation and the abnormality in the encoder can be detected distinctively from one another, and the abnormality in the encoder can be detected more accurately. A method of determining the upper limit frequency $f_{max}$ exemplified herein is an example, and the upper limit frequency may be any value that can differentiate the minute oscillation and the abnormality in the encoder.

REFERENCE SIGNS LIST

1 Encoder
2, 4 Level conversion circuit
3, 5 Pulsing circuit
6, 8 Counter
7, 9 Speed monitoring unit
10, 11 AD converter
12 Lissajous radius calculation processing unit
13 Diagnosis processing unit
14 Abnormality processing unit
15, 18 Stop determination processing unit
16, 19 Frequency measurement unit
17, 20 Frequency diagnosis unit
21 Lissajous waveform
22 Lissajous radius
23 Upper limit threshold
24 Lower limit threshold
25 Pulsing circuit input signal
26 Hysteresis width
27 Pulse signal

The invention claimed is:

1. An encoder abnormality diagnosis device configured to diagnose an abnormality in an encoder that outputs a cosine waveform and a sine waveform according to a rotation angle of an object, the encoder abnormality diagnosis device comprising:
a counter which generates a count value of a pulse signal obtained by pulsing of each of the cosine waveform and the sine waveform;
a stop determination processing unit configured to receive the count value from the counter and determine whether the object is rotating or stopping, based on a change in the count value;
a frequency measurement unit configured to measure a frequency of the pulse signal; and
a frequency diagnosis unit configured to receive the frequency measured by the frequency measurement unit and compare the frequency measured by the frequency measurement unit with a preset upper limit frequency when the stop determination processing unit determines that the object is stopping, and to determine that an abnormality has occurred in the encoder when the measured frequency exceeds the upper limit frequency,
wherein the stop determination processing unit determines that the object is stopping when an absolute value of a difference between the count value previously received and the count value currently received is smaller than a predetermined value,
the stop determination processing unit outputs, to the frequency diagnosis unit, a stop flag in an on state when determining that the object is stopping, and the stop flag in an off state when determining that the object is rotating, and
with the stop flag being on, when a difference between the count value immediately after the stop flag is turned on and the count value currently received is equal to or greater than the predetermined value, the stop determination processing unit switches the stop flag from on to off.

2. The encoder abnormality diagnosis device according to claim 1, wherein the upper limit frequency is determined based on a control cycle of the object.

3. The encoder abnormality diagnosis device according to claim 2, wherein the upper limit frequency is represented by (1/(2·Tc)) where Tc is the control cycle of the object.

4. The encoder abnormality diagnosis device according to claim 1, wherein the upper limit frequency is determined based on a maximum acceleration of the object and a hysteresis width used for the pulsing.

5. The encoder abnormality diagnosis device according to claim 4, wherein the upper limit frequency is represented by $1/\pi \times ((\alpha_{max} \cdot Z)/(2\Delta H))^{1/2}$ where $\alpha_{max}$ is the maximum acceleration of the object, Z is the number of teeth of the encoder, and ΔH is the hysteresis width used for the pulsing.

* * * * *